United States Patent
Noyama et al.

(10) Patent No.: US 7,270,261 B2
(45) Date of Patent: Sep. 18, 2007

(54) PRINT MANAGEMENT SYSTEM

(75) Inventors: Hideo Noyama, Yokohama (JP); Takeshi Matsuki, Tokyo (JP); Shuji Terada, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 10/929,521

(22) Filed: Aug. 31, 2004

(65) Prior Publication Data

US 2005/0213136 A1 Sep. 29, 2005

(30) Foreign Application Priority Data

Mar. 29, 2004 (JP) .............................. 2004-094143

(51) Int. Cl.
*B41J 2/01* (2006.01)
*G06F 17/00* (2006.01)
(52) U.S. Cl. ...................... 235/375; 347/15; 347/100
(58) Field of Classification Search ................ 235/487, 235/375; 347/15, 100–105

See application file for complete search history.

(56) References Cited

U.S. PATENT DOCUMENTS 6,832,825 B1 * 12/2004 Nishikori et al. ............ 347/19

6,854,822 B2 * 2/2005 Yashima et al. .............. 347/15
2004/0123100 A1 6/2004 Noyama et al.

FOREIGN PATENT DOCUMENTS

| JP | 2002-366981 | 12/2002 |
|----|-------------|---------|
| JP | 2003-136828 | 5/2003  |
| JP | 2004-199419 | 7/2004  |

* cited by examiner

*Primary Examiner*—Jamara A. Franklin
(74) *Attorney, Agent, or Firm*—Antonelli, Terry, Stout & Kraus, LLP.

(57) ABSTRACT

It has been impossible to suppress the copy of tickets which are printed on ordinary paper sheets. A client is provided with: a print control unit which prints a designated number of tickets. The acceptance server is provided with: a printed state verification unit which verifies the truth of the information on the state of printed matters; and a management unit which manages the type of a printer. Moreover, an issue server is provided with: a printing test data generating unit; a ticket generating unit which generates ticket data on the basis of the type of the printer; and a license data issuing unit which issues license data so as to instruct the number of ticket.

8 Claims, 9 Drawing Sheets

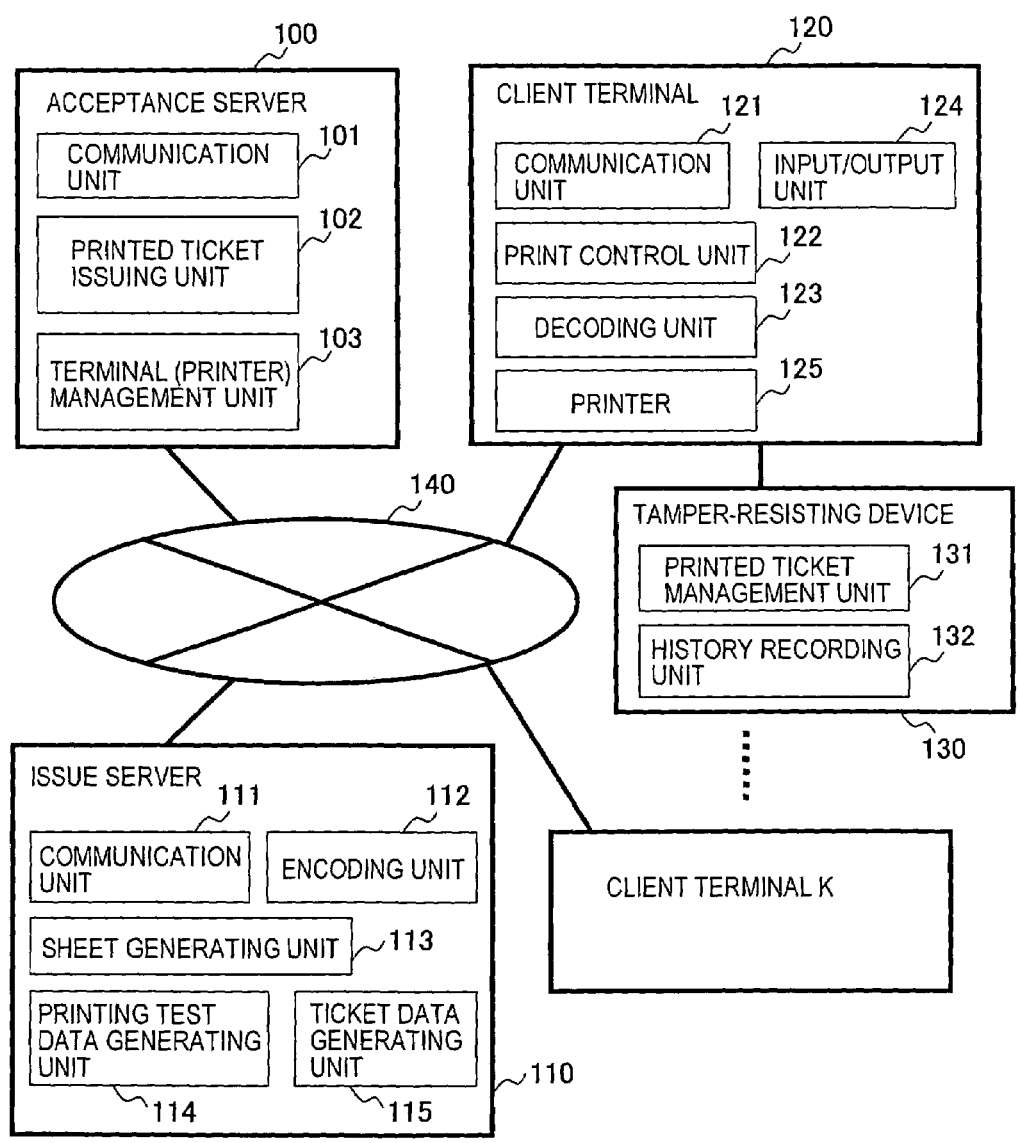

FIG.4A

PARAMETER A

400

|   | C | M | Y | K |
|---|---|---|---|---|
| 1 | 100% | 0% | 100% | 0% |
| 2 | 0% | 100% | 100% | 0% |
| 3 | 100% | 100% | 0% | 0% |

FIG.4B

PARAMETER B

410

|   | C | M | Y | K |
|---|---|---|---|---|
| 1 | 0% | 0% | b% | a% |
| 2 | 0% | 0% | 0% | 100% |
| 3 | d% | c% | 0% | a% |

PRINTING TEST DATA

TICKET DATA

PRINTING TEST DATA

CIRCLE   TRIANGLE   SQUARE

PRINTING TEST DATA

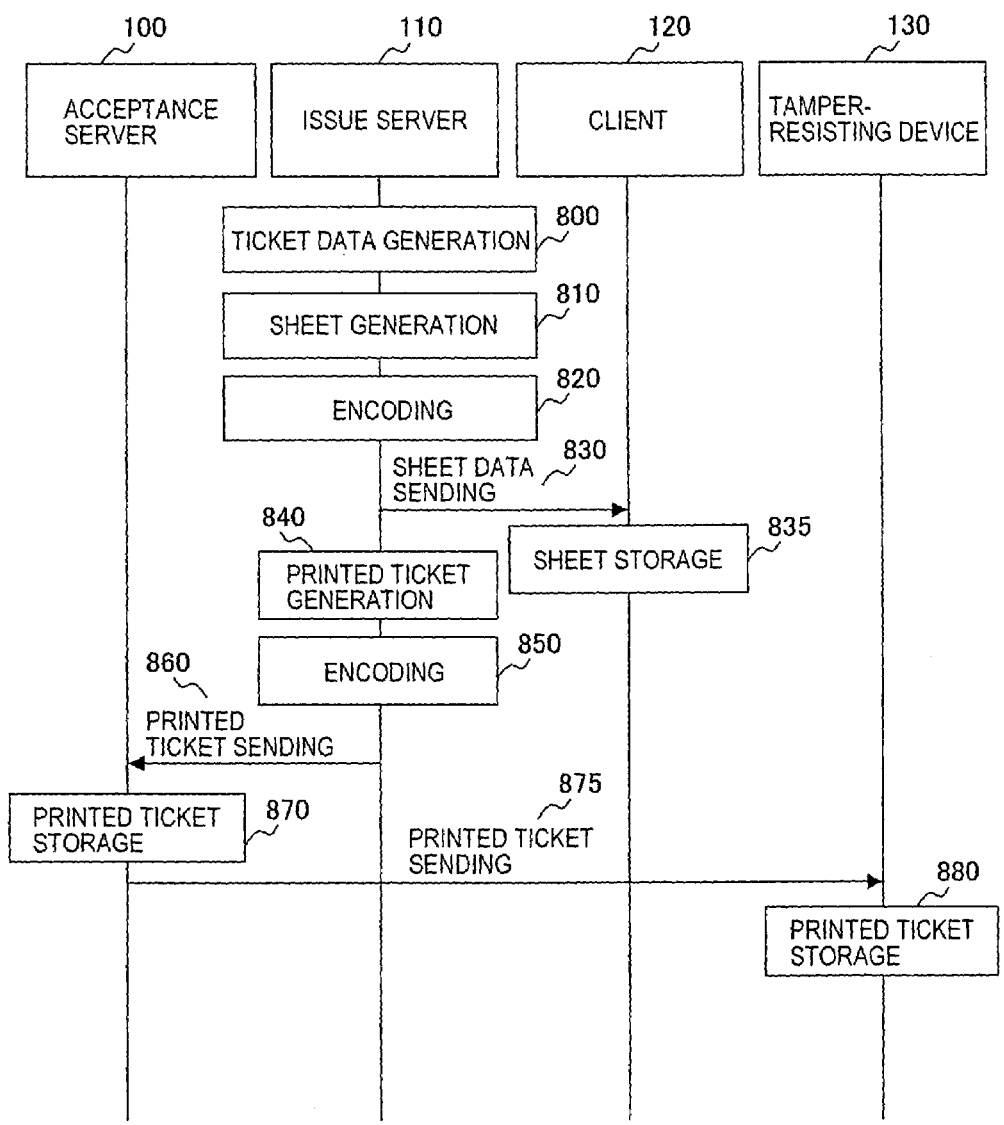

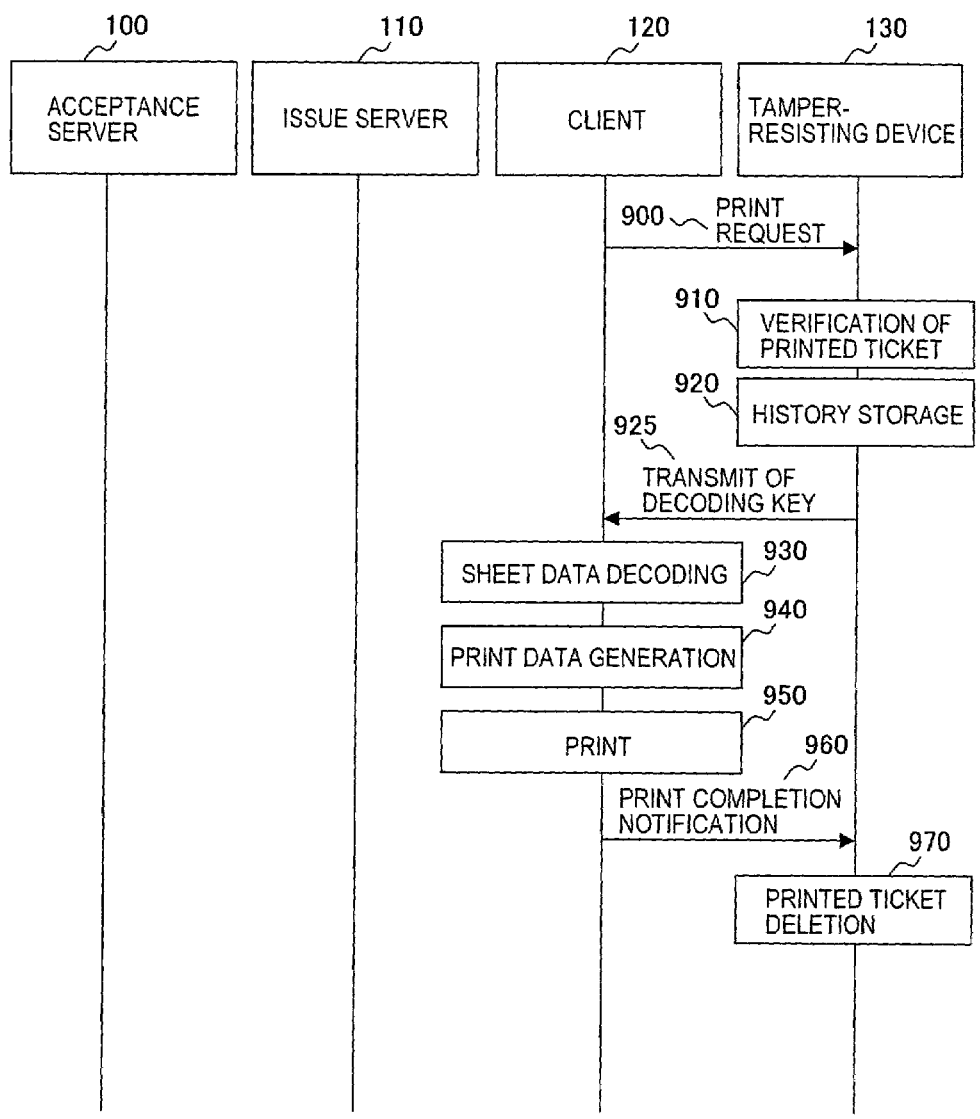

PRINT MANAGEMENT SYSTEM

This application relates to and claims priority from Japanese Patent Application, No. 2004-094143 filed on Mar. 29, 2004, the contents of which are incorporated herein by reference.

BACKGROUND OF THE INVENTION

The present invention relates to a printing method of electronic document data while preventing their forgery or copy.

More particularly, the present invention relates to a forgery preventing technique which prevents the printed matters from being copied in a currently spread printer.

The related art of the present invention is exemplified by Japanese Patent Laid-open Publication No. 2003-136828 (hereinafter, referred to as Patent Document 1) and Japanese Patent Laid-open Publication No. 2002-366981 (hereinafter, referred to as Patent Document 2).

In the invention described in Patent Document 1, one continuous gradation image can be printed in a predetermined area. At the same time, two continuous gradation images can be arranged equally in a predetermined area with neither any superimposition on a predetermined area nor any fusion of the mesh points. As a result, security prints which prevent forgery or alteration of the printed matters can be realized at a low cost with the four colors of cyan, magenta, yellow and black, which are widely used in the general market.

Of the four basic colors of the cyan (C), magenta (M), yellow (Y) and black (Bk) used generally in the commercial prints, more specifically, the black (Bk) is a black pigment composed mainly of carbon black, and exhibits an absorption over the whole range from an ultraviolet range to an infrared range. By making use of the fact that the superimposition of the other cyan (C), magenta (M) and yellow (Y) does not absorb the infrared ray, the image printed in the black ink (Bk) containing carbon black can be visually recognized by the observation using a survey device such as an infrared camera which observes the absorptivity of the infrared ray.

According to the invention described in Patent Document 2, a ticket issuing system having a high effect to prevent the counterfeit tickets from being printed by the forgery or copy can be provided merely by installing the ticket image encoding print programs provided by the ticket issuing center and by using the currently spread system of the terminal and the printer connected with the internet.

SUMMARY OF THE INVENTION

These methods of the related art have the following problems.

The technique of Patent Document 1 makes use of the following facts. Of the four basic color inks of the cyan (C), the magenta (M), the yellow (Y) and the black (Bk), the black (Bk) is a black pigment composed mainly of carbon black, and exhibits the absorption all over the range from the ultraviolet range to the infrared range, but the combination of the remaining cyan (C), the magenta (M) and the yellow (Y) does not absorb the infrared ray. The mesh points composing the continuous gradation image has to be colored, as designated, in the four color inks of the cyan (C), the magenta (M), the yellow (Y) and the black (Bk).

In the process (i.e., the edition separating process) to determine the quantities of inks of the individual colors to be used at the printing time from the original image data, as described in Japanese Patent Laid-open Publication No. 2002-211015, the under-color removing process (In the case of the black ink, the quantity of the black ink is determined, and the quantities of the individual colors are determined to express the remaining color components) and the duty limiting process (The cyan (C) and the magenta (M) are so partially replaced by a light cyan (LC) and a light magenta (LM) as to reduce the graininess within the range of the ink quantities permitted for the individual printing media) are performed generally.

Specifically, the edition separating process will result in the printing with a different ink from the designated ones. Thus, it is impossible to achieve the effect described in Patent Document 1, that is, the effect that the image printed in the black ink containing the carbon black can be visually recognized only in case it is observed by using the special survey device such as the infrared camera.

Here, most of the commercially available printers excepting some expensive printers cannot avoid the aforementioned edition separating process. This is because the interface of the personal computer in current use inputs the individual colors of red (R), green (G) and blue (B) so that the color changes from the color system of RGB to the color system of CMY and the edition separating process are simultaneous carried out, when the data is sent from the OS to the printer, in the printer driver or the printer controller interposed between the OS and the printer.

With an application capable of expressing the original image data in the four colors of the cyan (C), the magenta (M), the yellow (Y) and the black (Bk), the aforementioned image cannot be printed in the designated ink distribution so that the expected effect cannot be attained.

In the technique of Patent Document 2, the ticket image files are encoded so that they cannot be decoded without using the dedicated programs installed on the user terminal. The decoded ticket image files can be printed only in case those dedicated programs are used.

In case the ticket printing instruction is inputted by the user, moreover, the dedicated programs transmit the print permitting request message to the ticket issuing server, and this ticket issuing server returns the ticket issue permitting message within a range not exceeding a predetermined print number. The dedicated programs at the user terminal perform the printing process only in case they receive the ticket issue permitting message. With this configuration, it is possible to provide a ticket issuing system which has a high effect preventing the forged or copied counterfeit tickets from being printed.

However, no consideration is taken into the fear that the printed paper tickets are copied. This is based on the concept that the event tickets or the like are assigned to the seats so that the forgery can be easily found because the copied tickets cannot take the reserved seats.

However, the suppression for the aforementioned reason is not effective for the unreserved seats, but the forged reserved seats will cause a confusion in the event.

First, the present invention provides a security printing technique which prevents the forgery or copy of printed matters, at a reasonable cost, such that even in case the printed matters are to be generated through the edition separating process, the images (or invisible images), which cannot be recognized under a visible light, that is, with naked eyes (including the use of spectacles), may be visually recognized when observed by using a survey device capable of observing the difference in the absorptivity of the infrared ray.

Secondly the present invention provides a printed matter issuing system which can prevent not only the print data or electronic information from being forged or copied but also the printing medium such as a paper printed with the data from being forged or copied.

The present invention provides a ticket issuing system which is enabled, by exemplifying the tickets as the printed matters and by limiting the use of the tickets at a specific place and for a specific time as in the event, not only to make an overlap check (i.e., to check that one ticket has the same identification number) but also to doubly check the ticket such as a traffic ticket to be used at an indefinite place and for an indefinite time.

According to the present invention, more specifically, an issue server is provided with: a mesh point image data generating unit which generates a mesh point image expressed in mesh points so as to express a continuous gradation image; and an invisible image generating unit which makes the mesh point image invisible with different parameters by holding not only at least two kinds of parameter tables so adjusted in advance in the ink mixing ratios as to form the invisible image in the same colors under the visible light but also one parameter for coloring the mesh point image separately according to a plurality of ink mixing ratios defined in these parameter tables, and by coloring the mesh point image separately with one coloring parameter according to the plurality of mixing ratios on the basis of that parameter.

In addition to the above, according to the present invention, a client terminal is provided with: a decoding unit which decodes the encoded printed matter data; a print control unit which prints a permitted number of sheets designated for the printed tickets; and an input/output unit which notifies an acceptance server of the information on the printed results.

The issue server is further provided with a printing test data generating unit which generates the testing data, and an encoding unit which encodes those data.

The acceptance server is further provided with a printing-state verification unit which verifies the truth of the information on the state of the printed matters, and a printed ticket issuing unit which issues the printed tickets.

According to the present invention, it is possible to provide a configuration which enables to recognize the image (or the invisible image) difficult to recognize under the visible light, by using the commercially available, relatively inexpensive printer.

Therefore, it is possible to suppress the forgery or copy of the printed matters.

BRIEF DESCRIPTION OF THE DRAWINGS

FIG. 1 is a diagram of a system configuration which realizes the present embodiment;

FIG. 4A is a table enumerating ink component percentages corresponding to the individual rectangular areas of a filling pattern;

FIG. 4B is a table enumerating ink component percentages corresponding to the individual rectangular areas of a filling pattern;

FIG. 8 shows a processing flow which generates the print data of a ticket; and

FIG. 9 shows a processing flow which assures that a predetermined number of tickets was printed.

DESCRIPTION OF THE EMBODIMENT

Figure 2A:
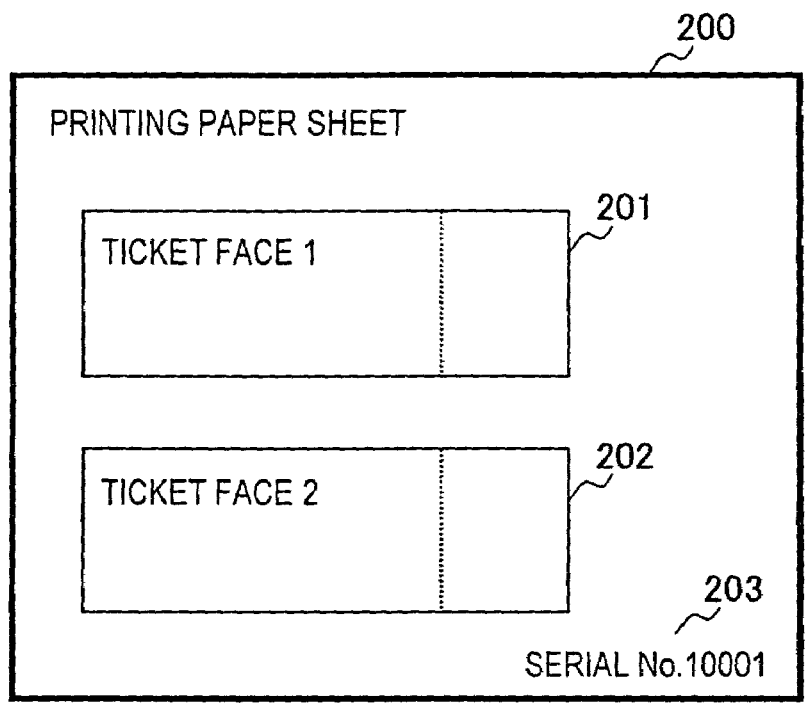
FIG. 2A shows an example of ticket data to be generated by an issue server.

An embodiment of the present invention exemplifying a ticket as a printed matter will be described in detail in the following. However, the application of the present invention should not be limited to the ticket but can be extended generally to the printed matters.

FIG. 1 is a diagram of a system configuration which realizes the present embodiment.

The configuration components of the present embodiment are an acceptance server 100, an issue server 110 and one or more client terminal device (hereinafter, called to as "client") 120. The acceptance server 100 and the issue server 110 may be functions to be realized on either physically distant, different information processing devices or an identical information processing device. Moreover, the acceptance server 100, the issue server 110 and the clients (1 to K) are connected through a communication unit 101, a communication unit 111 and communication unit 121, respectively, with each other through an open network 140. This network 140 may be public or private circuits or may be wireless or wired. Moreover, a tamper-resisting device such as an IC card or a smart card (hereinafter, called to as "tamper-resisting device") 130 can be connected with the client terminal 120.

Figure 7:
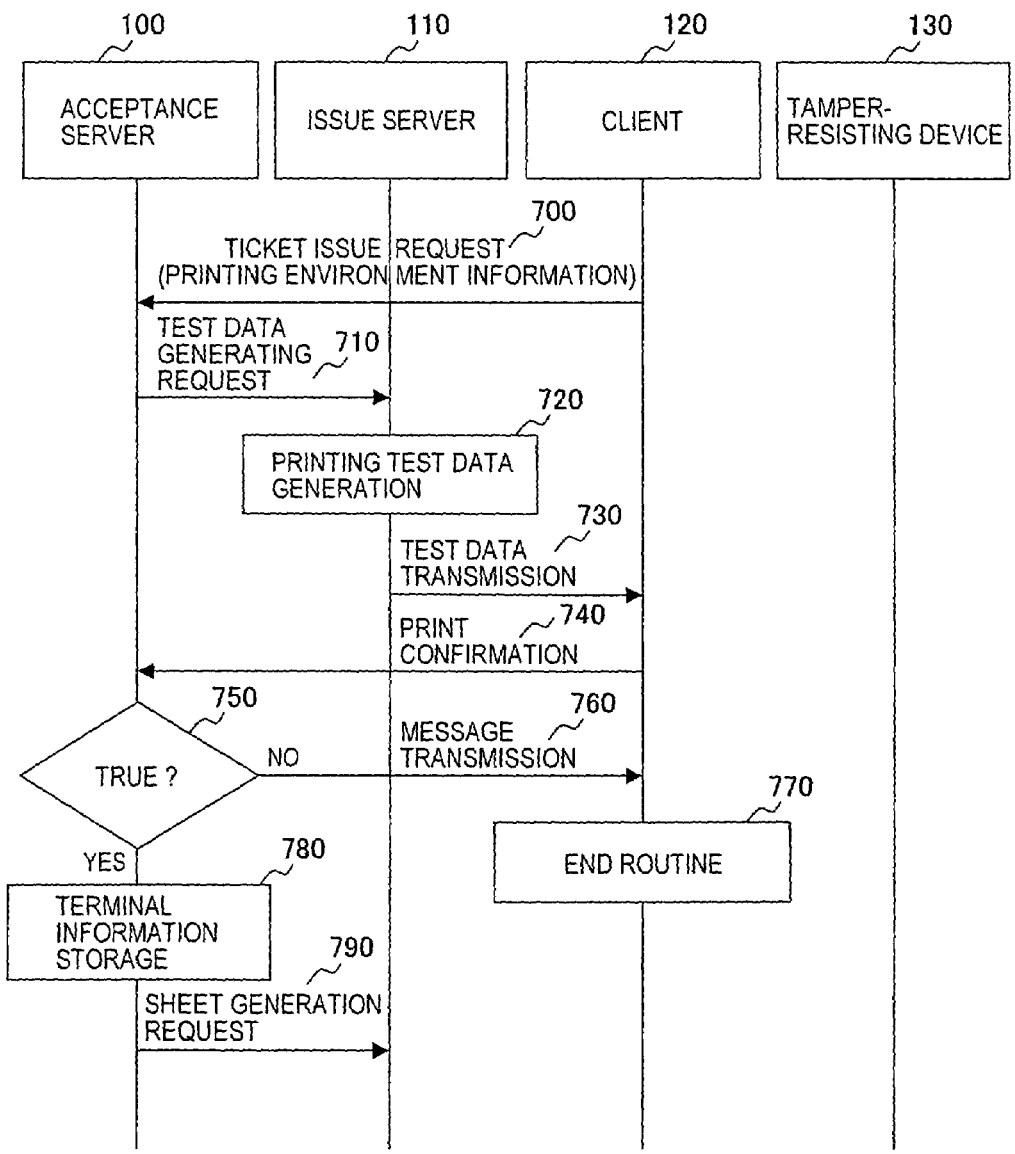
FIG. 7 shows a processing flow which examines the printing environment of a client.

FIG. 7 shows a processing flow which examines the printing environment of the client 120. FIG. 8 shows a processing flow which generates the print data of a ticket. FIG. 9 shows a processing flow which assures that a predetermined number of tickets were printed.

In FIG. 7, the acceptance server 100 receives a ticket issue request of the client 120 (at Step 700), and transmits a request for generating the printing test data to the issue server 110 (at Step 710).

The issue server 110 generates printing test data 500 at a printing test data generating unit 114 (at Step 720), and transmits the printing test data 500 to the client 120 (at Step 730).

Next, the client 120 prints the printing test data 500 on a paper sheet by a printer 125, and accepts the input of a print confirmation (at Step 740) at an input/output unit 124 and transmits it to the acceptance server 100. The print confirmation at Step 740 can be interactively processed by using the Web browser, for example.

Figure 5A:
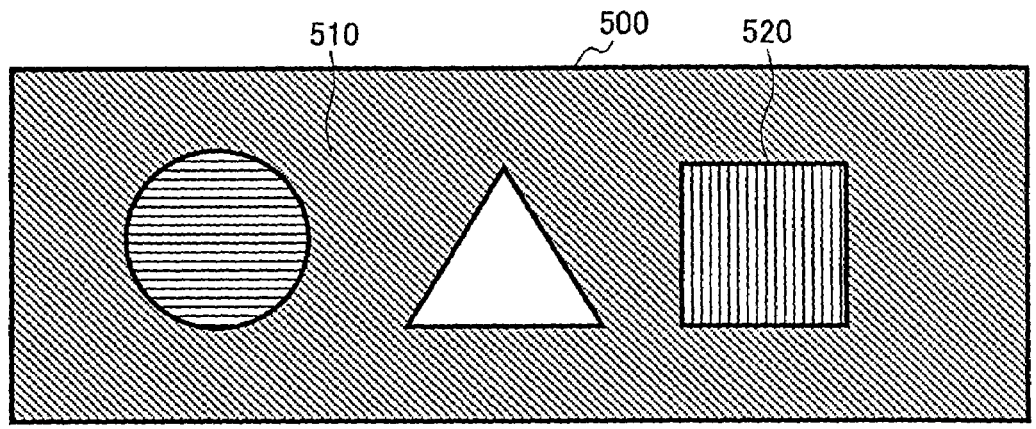
FIG. 5A shows an example of printing test data to be generated by the issue server.
Figure 5B:
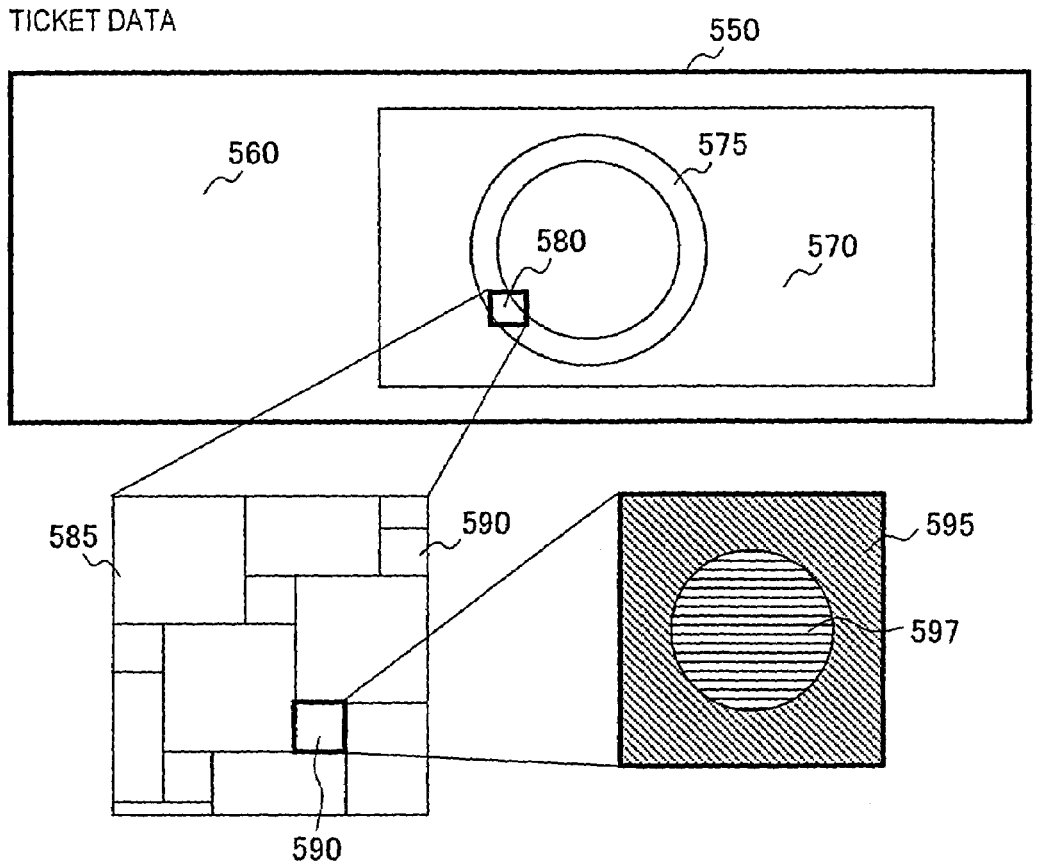
FIG. 5B shows an example of ticket data to be generated by the issue server.

FIGS. 5A and 5B show examples of the printed results of printing test data and ticket data to be generated by the issue server 110.

In the printing test data 500, a background 510 and an image area 520 are so designated that the filling patterns may be undiscriminatingly drawn under a visible light but according to the ink component percentages to create colors having optical properties different from each other. These component percentages are enumerated in later-described parameter tables. Moreover, the densities of inks used in the image area 520 are so discriminated that a triangular image is filled out in a parameter of a density of 30%, that a square image is filled out in a parameter of a density of 35%, and that a round image is filled out in a parameter of a density of 40%.

At this time, the information for print confirmation (of Step 740) is the image information, on which the user has reported that the image could be read under the visible light such as with the naked eyes when several images had been printed with the printing test data 500 by varying the densities of inks gradually.

The ticket data 550 is configured to have an area 570 having been subjected to a copy preventing processing, and the remaining area 560. Moreover, the area 570 contains an invisible image 575. This invisible image 575 is hard to be recognized under the visible light but can be visually recognized in case it is observed with an evaluation device (hereinafter, called to as "infrared camera") which observes the absorptivity of an infrared ray.

A portion of the area containing the invisible image 575 is set as a small area 580. When this small area 580 is enlarged, it is configured of an area 585 which is expressed in three colors of cyan (C), a magenta (M) and yellow (Y) and which is recorded with an image visible under the visible light, and an area 590 which is recorded with a continuous gradation image invisible under the visible light.

When the area 590 is further enlarged, there can be observed an area 595 which is filled out with a parameter A in the parameter table, and an area 597 which is filled out with a parameter B. Here, the continuous gradation image is recorded in the area 597 and can be observed with the infrared camera.

A forgery can be made difficult by making the image to be recorded in the area 597, in a continuous gradation (or in gray scale).

The acceptance server 100 receives the information for the print confirmation (at Step 740), and determines whether the received information is true or not (at Step 750).

In the case that the information for the print confirmation is true, the acceptance server 100 stores the density information on inks corresponding to the kinds of images (at Step 780), and requests the issue server 110 to generate the ticket data and the printing sheet (at Step 790). In the case that the information for the print confirmation is false, the acceptance server 100 returns an error message to the client 120 (at Step 760), and terminates a ticket issuing routine (at Step 770).

The method for generating the printing test data 500 and the method for determining whether it is true or not in Step 750 will be described in detail with reference to FIGS. 3A and 3B, FIGS. 4A and 4B and FIGS. 6A and 6B.

Figure 2B:
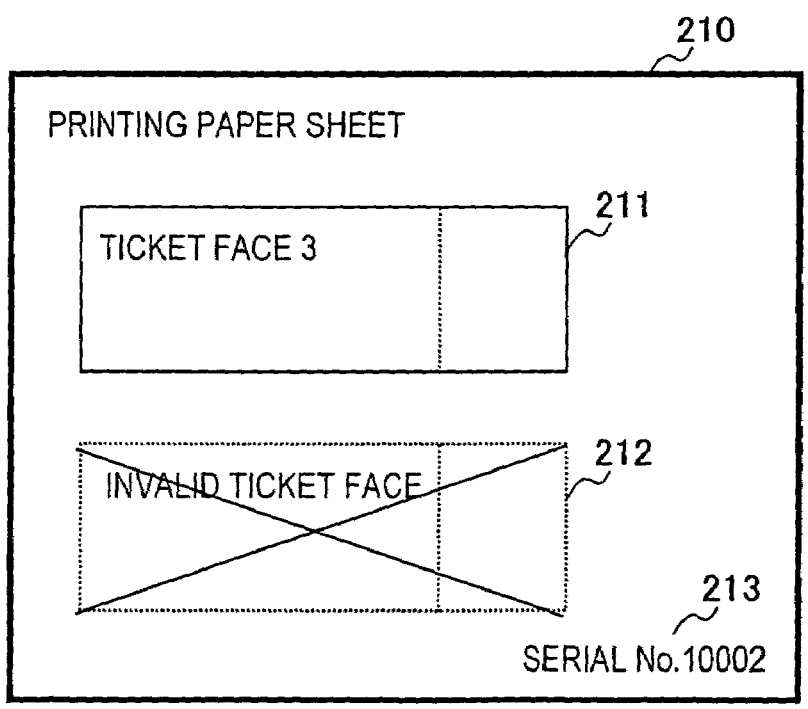
FIG. 2B shows an example of ticket data to be generated by an issue server.

FIGS. 2A and 2B are explanatory diagrams of printed matters showing the relations between the printing paper sheets and the ticket faces printed on the sheets.

FIG. 8 shows a routine process to be executed subsequent to Step 790 of FIG. 7.

A ticket data generating unit 115 of the issue server 110 generates the ticket data 550 having been subjected to the copy preventing processing (at Step 800). Moreover, a sheet generating unit 113 generates a printing paper sheet 200 and a printing paper sheet 210, in which the ticket data 550 are arranged, as shown in FIGS. 2A and 2B (at Step 810).

The sheet 200 and the sheet 210 in FIGS. 2A and 2B exemplify the case, in which a request for issuing three tickets is made at Step 700 so that the two ticket data 550 are arranged and printed on one printing paper sheet. A ticket face 1 (201), a ticket face 2 (202) and a serial number 203 are arranged on the printing paper sheet 200. A ticket face 3 (211), an invalid ticket face (212) and a serial number 213 are arranged on the printing paper sheet 210. Moreover, the ticket data 550 are printed on the ticket face 1, the ticket face 2 and the ticket face 3. On the invalid ticket face, on the other hand, there is printed an invalid mark which indicates that the ticket face area is invalid.

An encoding unit 112 of the issue server 110 encodes those sheet data (at Step 820), and sends the encoded data to the client 120 (at Step 830). In this encoding process, it is desired that a unique decoding key is made to correspond to each sheet so that the sheet data may be encoded with an encoding key matching the decoding key.

The client 120 stores the encoding data sent at Step 830 (at Step 835).

A printed ticket issuing unit 102 of the issue server 110 generates printed ticket data which is license data permitting the printing of the sheet data (at Step 840). The printed ticket issuing unit 102 encodes the printed ticket data with an open key matching a secret key stored in the tamper-resisting device 130 (at Step 850), and sends the encoded data to the acceptance server 100 (at Step 860).

The acceptance server 100 stores the printed ticket issuing unit 102 with the printed ticket data sent (at Step 870).

The routine from Step 710 to Step 870 has been described as a series of process using the ticket issue request of Step 700 as the trigger. In case the client 120 is limited, the ticket data and the printed ticket data may also be generated in advance so that the encoded ticket data may be stored in the client 120 whereas the encoded printed ticket data may be stored in the acceptance server 100.

In response to the ticket issue request of Step 700, the acceptance server 100 transmits the printed ticket data to the tamper-resisting device 130 (at Step 875), and this tamper-resisting device 130 stores the printed ticket data received (at Step 880).

Although not shown, the protocols which send the printed ticket data from the acceptance server 100 to the tamper-resisting device 130 are identical to the protocols which store the data such as an electronic ticket in the IC card or the like thereby to assure the uniqueness of the printed ticket data.

In FIG. 9, the client 120 sends a print request for printing the ticket to the tamper-resisting device 130 (at Step 900), and confirms the validity of the printed ticket data in a printed ticket management unit 131 of the tamper-resisting device 130 (at Step 910). In case the printed ticket data are valid, the tamper-resisting device 130 stores such history information (e.g., an extracted decoding key) in a history recording unit 132 (at Step 920) as indicates that the printed ticket data have been used. In the validity confirmation at Step 910, it is verified with an electronic signature that the printed ticket has been issued from the issue server 110, and it is confirmed that the printed ticket data have not been used for the history information.

The client 120 acquires the decoding key extracted from the tamper-resisting device 130 (at Step 925), and decodes the sheet data at a decoding unit 123 (at Step 930).

Moreover, the client 120 generates the print data from the sheet data (at Step 940), and prints them on the paper sheet with the printer 125 (at Step 950). Then, the client 120 sends the print completion notification to the tamper-resisting device 130 (at Step 960). Here, the processes of the client 120 thus far described are performed mainly in a print control unit 122.

The printed ticket management unit 131 of the tamper-resisting device 130 receives the aforementioned print completion notification such as the serial number contained in the sheet data. The management unit 131 records the completion notification in the history recording unit 132 and deletes the corresponding printed ticket data (at Step 970).

In order to prevent the fraud from being caused by an unlawful application (e.g., a forged application due to a disassembly) by the client 120, it is desired that the printed ticket is issued as a right to print the sheet data on only one sheet. In case the application program to work on the client 120 can be practically relied on, however, a printed ticket having a right to print data of a plurality of sheets may be issued so that the printed sheet number may be subtracted in the process of Step 970.

Moreover, the tamper-resisting device 130 may be provided with a verification unit which verifies the truth of the information for the print confirmation so that the history may be recorded only in case the decision is correct.

In this embodiment, the acceptance server 100, the issue server 110 and the client 120 are exemplified by the so-called personal computer and work station or the like so that the processors working on such computers may execute the programs to realize the aforementioned individual functions.

On the other hand, especially the computer of the user should not be limited to the so-called computer device but may be a multi-function mobile terminal, if the computer is provided with a storage device, a display and input/output device, a communication device and a print device and if the processor can execute the programs stored in the storage device. Moreover, the programs may be either stored in advance in the storage device or introduced, if necessary, into the storage device through the storage medium or communication medium (e.g., the communication lines or the carrier waves on the communication lines) which can be used by the computer.

Figure 3A:
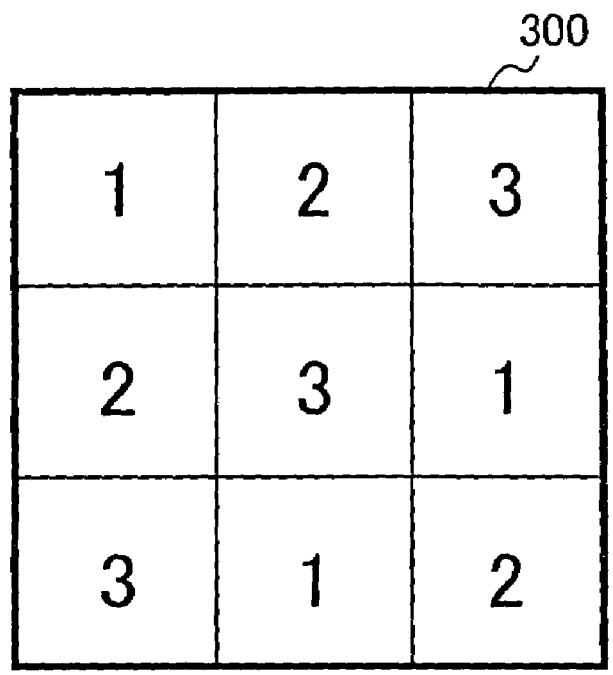
FIG. 3A is an explanatory diagram showing a filling pattern necessary for realizing a paper copy preventing function.
Figure 3B:
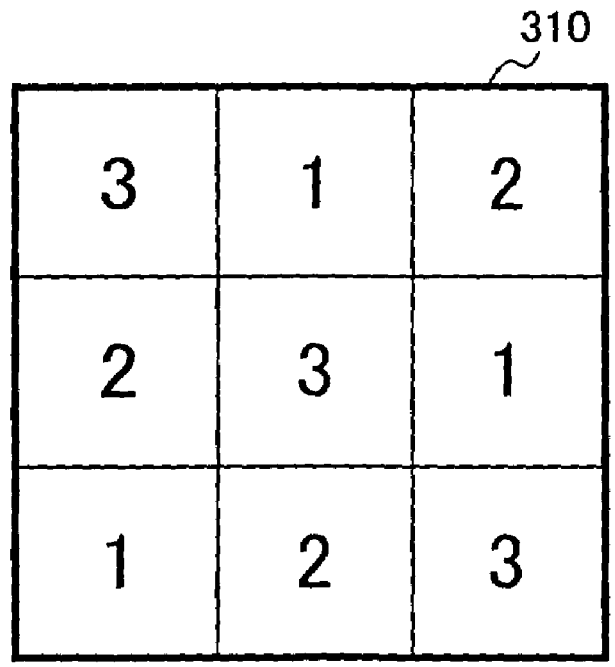
FIG. 3B is an explanatory diagram showing a filling pattern necessary for realizing a paper copy preventing function.

FIGS. 3A and 3B are explanatory diagrams showing the filling patterns necessary for realizing the paper copy preventing function, and FIGS. 4A and 4B are parameter tables showing ink component percentages corresponding to the individual rectangular areas of the patterns.

Figure 6A:
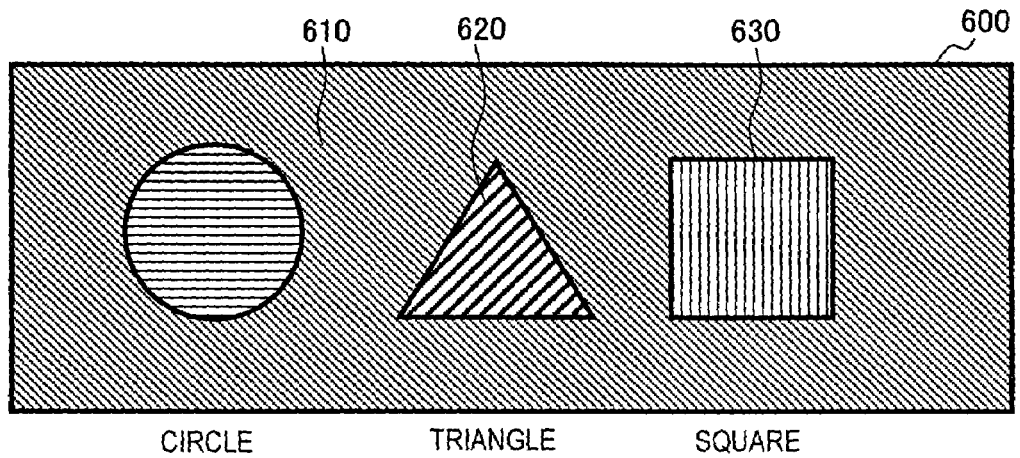
FIG. 6A is an explanatory diagram showing a variation of the printing test data.
Figure 6B:
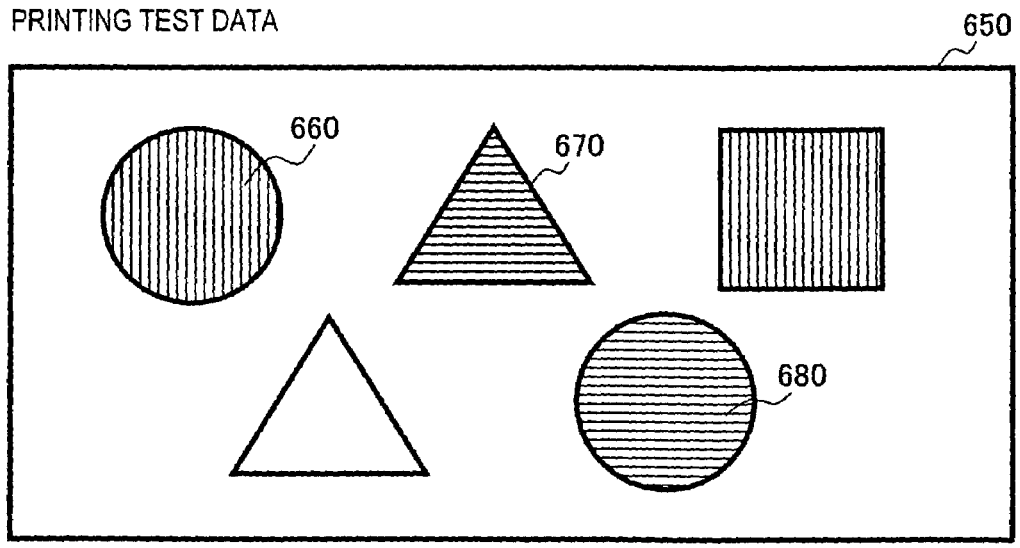
FIG. 6B is an explanatory diagram showing a variation of the printing test data.

Moreover, FIGS. 5A and 5B show the examples of printing test data to be generated by the issue server, and FIGS. 6A and 6B are explanatory diagrams showing variations of the printing test data.

A filling pattern 300 in FIG. 3A is a unit pattern which fills the image area 520 and the background 510 of the printing test data. The numerals defined in the filling pattern 300 correspond to the row numbers in a parameter A table 400 and a parameter B table 410 shown in FIGS. 4A and 4B. Specifically, a rectangular area 1 in the filling pattern 300 is filled out, in case it belongs to the background 510, with a mixed color of C (cyan) of 100% and Y (yellow) of 100%, as indicated at the row number 1 in the parameter A table 400, but in case it belongs to the image area 520, with a mixed color of Y (yellow) of b % and K (black) of a % (a+b=100), as indicated at the row number 1 in the parameter B table 410.

Likewise, a rectangular area 2 is filled out, in case it belongs to the background 510, with a mixed color of M (magenta) of 100% and Y (yellow) of 100%, as indicated at the row number 2 in the parameter A table 400, but in case it belongs to the image area 520, with K (black) of 100%, as indicated at the row number 2 in the parameter B table 410.

Moreover, a rectangular area 3 in the filling pattern 300 is filled out, in case it belongs to the background 510, with a mixed color of C (cyan) of 100% and M (magenta) of 100%, as indicated at the row number 3 in the parameter A table 400, but in case it belongs to the image area 520, with a mixed color of C (cyan) of d %, M (magenta) of c % and K (black) of a % (a+c+d=100), as indicated at the row number 3 in the parameter B table 410.

The K (black) is used not in the parameter A table but in the parameter B table so that the image can hardly be discriminated under the visible light but can be discriminated by observing the absorptivity of an infrared ray.

The filling pattern 300 may be replaced by a pattern 310 or another pattern having a different arrangement. However, the pattern may be arranged evenly having no continuity of the same color so as to cause no visual disorder.

In this embodiment, too, the properties, in which the mixed color of cyan, magenta and yellow lacking K (black) can hardly be discriminated with the visible light from K (black), are applied like the technique of Patent Document 1 so that the mixing ratio can hardly be estimated from the printed matters.

In the case of the printed matters printed by the ink jet printer, moreover, a plurality of ink particles diffuse on or bleed to stick the paper face so that the printed matters can hardly be copied in high fidelity even by a copying machine having high scanning performances. (It takes an enormous cost to express the splash or bleeding of the ink particles on a paper sheet of a different paper quality and with a different ink. This processing is not performed in the copying machine, because the visual effect has no meaning even if the processing is technically possible.) Even if the printed matters produced by the method of this embodiment are reproduced by using the copying machine, the invisible image can hardly be reproduced so that the forgery or copy of the printed matters can be suppressed.

Here will be described a method which determines whether the information reporting the printed results is true or not. Printing test data 600 are configured to have a background 610 and several kinds of image areas 620 and 630. The image area 620 and the background 610 are filled out with the aforementioned patterns. For the printing test data 600, however, there are used the data, in which the mixing ratios a to d of the parameter table 410 are set to slightly different values for the images. With these ink mixing ratios being thus varied, the images which can and cannot be discriminated under the visible light, are formed at the printing time.

The visually discriminated images or the indiscriminated images are reported, and the ticket data 550 are printed at the ink mixing ratios matching the reports. Then, the copy preventing pattern 575 hidden in the background 570 of the ticket data 550 can be detected with the machine which measures the absorptivity of the infrared ray.

Here, in case the reliability of the self-report of the user is unknown, the combination between the shapes of the images and the ink mixing ratios is made random as shown in the printing test data 650, and the process from Step 710 to Step 740 are repeated several times. Then, whether or not the reported contents are reliable can be decided in a high probability by confirming whether or not the mixing ratio reported as invisible in the first print confirmation of Step 740 is equal to that reported as invisible in the second and subsequent print confirmations.

Moreover, the images filled with the aforementioned pattern are contained in the printing test data 600, and the printed results are reported by the user. However, the images may also be contained in the sheet data 200 so that the history may be recorded on the basis of the report of the printed results.

In case the naturally visible image of the sheet data 200 printed is not reported or in case the naturally invisible image is reported, the printer different from the printer information recorded in a terminal management unit 103 may be connected with the client 120, or an improper ticket may probably have been printed intentionally or carelessly. This information is useful, if recorded in time series in the tamper-resisting device 130, for meeting a claim from the user or for auditing the running of the client 120.

According to the embodiment thus far described, it is possible not only to prevent the forgery or copy of the ticket data or the electronic information but also to suppress forgery or copy of the printed paper tickets. As a result, it is possible to manage the number of tickets more precisely than the prior art.

When a ticket issuing system needing a strict number management is to be configured, moreover, the system can be provided at a relatively low cost without providing the user environment with any dedicated device or configuring a large-scaled client monitoring system.

What is claimed is:

1. A print management system comprising an issue server, an acceptance server and a client terminal and managing the printing of sheets,
    wherein said issue server includes:
    a parameter table which stores a plurality of sets of parameters where, one set of parameters is made up of a plurality of ink mixing ratios for filling out a filling pattern;
    means which fills out a filling pattern in accordance with the ink mixing ratios stored as said one set of parameters; and
    printing test data generating means which generates the printing test data with said filling pattern,
    wherein the areas filled with said one set of parameters have different optical properties,
    wherein said printing test data use said filling patterns generated according to said different parameters, as a background and an image respectively,
    wherein said client terminal includes:
    printing means which prints said printing test data; and
    transmitting means which accepts self-report data by a user of said client terminal, on whether or not said image and said background printed can be discriminated, and transmits the self-report data to said acceptance server, and
    wherein said acceptance server includes:
    specifying means which specifies at least one set of parameters containing the ink mixing ratios creating the user-undiscriminating colors in the case of printing at said client terminal; and
    requesting means which requests said issue server for generating the print data to print said sheets with said specified parameters.

2. A print management system according to claim 1, wherein,
    said printing test data generating means in said issue server generates said plural printing test data with a plurality of sets of parameters stored in said parameter table,
    said acceptance server further includes a verification means which receives a plurality of self-report data individually corresponding to said plural printing test data and verifies the truth of said self-report data, and requests the generation of said print data when the self-report data is judged to be true at said verification means.

3. A print management system according to claim 1, wherein,
    said issue server further includes:
    means which encodes said print data generated in response to the request from said acceptance server, and transmits the encoded data to said client terminal; and
    printed ticket generating means which generates a printed ticket or a license permitting said print data to be decoded, and
    said client terminal further includes:
    means which receives and verifies said printed ticket; and
    print data decoding means which decodes said print data when said printed ticket is judged to be valid by said verification.

4. A print management system according to claim 3, wherein,
    said issue server further includes:
    means which transmits said printed ticket corresponding to said sheet in advance to said acceptance server, and then transmits said print data corresponding to said sheet to said client terminal, and
    said acceptance server further includes:
    means which receives a request for printing said sheet from said client terminal; and
    means which transmits said printed ticket to said client terminal in response to said print request.

5. A print management system according to claim 3, wherein,
    said printed ticket generating means specifies the number of prints for said printed ticket, and
    said print data decoding means decodes the print data when the print number specified in said printed ticket is at least one.

6. A print management system according to claim 3, further comprising:
    a tamper-resisting device connected with said client terminal, wherein,
    said tamper-resisting device includes:
    means which stores a decoding key to be used for said decoding;
    means which receives said printed ticket data from said client terminal and verifies the received data; and
    means which transmits said decoding key to said client terminal when said printed ticket is judged to be valid by said verification, and
    said print data decoding means performs said decoding with said decoding key.

7. A print management system according to claim 6, wherein,
    said tamper-resisting device further includes:
    means which generates a printing history and deletes said printed ticket when the tamper-resisting device receives a print end notification from said client terminal.

8. A print management system according to claim 1, wherein,
    the pattern filled out with a plurality of ink mixing ratios stored as said one set of parameters creates a color which cannot be discriminated under a visible light but can be discriminated by observing the absorptivity of an infrared ray.

* * * * *